(12) United States Patent
Stockinger et al.

(10) Patent No.: US 6,479,587 B1
(45) Date of Patent: Nov. 12, 2002

(54) CROSSLINKABLE POLYUREA POLYMERS

(75) Inventors: Friedrich Stockinger, Courtepin (CH); Andreas Ackermann, Gurmels (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/508,785

(22) PCT Filed: Sep. 14, 1998

(86) PCT No.: PCT/EP98/05826

§ 371 (c)(1),
(2), (4) Date: Mar. 16, 2000

(87) PCT Pub. No.: WO99/14253

PCT Pub. Date: Mar. 25, 1999

(30) Foreign Application Priority Data

Sep. 16, 1997 (EP) ............................................. 97810666

(51) Int. Cl.[7] ........................... C08F 2/46; C08G 18/67; C08G 18/70; C08G 18/50

(52) U.S. Cl. ...................... 525/131; 525/123; 525/128; 525/903; 523/106; 264/2.6; 522/173; 522/174; 522/150; 522/151; 522/152

(58) Field of Search ................................ 525/131, 123, 525/128, 903; 523/106; 351/160 H, 160 R; 264/2.6, 1.7, 328.6; 522/173, 174, 150, 152, 151

(56) References Cited

U.S. PATENT DOCUMENTS

| | | | | |
|---|---|---|---|---|
| 3,503,942 A | * | 3/1970 | Seiderman | 260/80.75 |
| 4,254,065 A | * | 3/1981 | Ratkowski | 264/2.5 |
| 4,359,558 A | * | 11/1982 | Gould et al. | 525/454 |
| 4,408,023 A | * | 10/1983 | Gould et al. | 525/454 |
| 4,430,458 A | * | 2/1984 | Tighe et al. | 523/108 |
| 4,454,309 A | * | 6/1984 | Gould et al. | 525/454 |
| 4,536,554 A | * | 8/1985 | Lim et al. | 526/264 |
| 4,644,033 A | * | 2/1987 | Gnanou et al. | 524/590 |
| 4,780,488 A | * | 10/1988 | Su et al. | 523/106 |
| 4,786,657 A | * | 11/1988 | Hammar et al. | 522/90 |
| 4,857,606 A | * | 8/1989 | Du et al. | 525/455 |
| 4,859,780 A | * | 8/1989 | Molock et al. | 548/550 |
| 4,923,666 A | * | 5/1990 | Yamazaki et al. | 264/572 |
| 4,931,521 A | * | 6/1990 | Matsuda et al. | 526/286 |
| 4,983,702 A | * | 1/1991 | Mueller et al. | 528/28 |
| 5,039,769 A | * | 8/1991 | Molock et al. | 526/301 |
| 5,087,392 A | * | 2/1992 | Burke et al. | 264/2.7 |
| 5,170,192 A | * | 12/1992 | Pettigrew et al. | 351/161 |
| 5,656,210 A | * | 8/1997 | Hill et al. | 264/2.6 |
| 5,674,942 A | * | 10/1997 | Hill et al. | 525/131 |

FOREIGN PATENT DOCUMENTS

| | | |
|---|---|---|
| DE | 40 25 776 A1 | 8/1990 |
| EP | 0 177 289 A2 | 9/1985 |
| EP | 0 406 161 A2 | 6/1990 |
| EP | 0 735 097 A1 | 3/1996 |
| EP | 0 748 685 A2 | 3/1996 |

OTHER PUBLICATIONS

Abstract—Chemical Abstracts vol. 116: 256262H (1992).
International Search Report.

* cited by examiner

*Primary Examiner*—James J. Seidleck
*Assistant Examiner*—Sanza L. McClendon
(74) *Attorney, Agent, or Firm*—R. Scott Meece; Jian S. Zhou; Richard Gearhart

(57) ABSTRACT

The invention relates to novel crosslinkable prepolymers of formula (1), wherein the variables have the meanings given in the claims, to homo- or co-polymers obtainable therefrom by crosslinking and to mouldings, such as, especially, contact lenses, made from those homo- or co-polymers.

28 Claims, No Drawings

CROSSLINKABLE POLYUREA POLYMERS

The present invention relates to novel crosslinkable polyureas, to a process for the preparation thereof and to the use thereof in the manufacture of mouldings, especially ophthalmic mouldings, for example contact lenses.

The present invention relates to prepolymers of formula $$Q\text{—}CP\text{—}Q \qquad (1),$$

wherein

Q is an organic radical that comprises at least one crosslinkable group, and

CP is a bivalent copolymer fragment consisting of the segments A, B and T, wherein:

A is a bivalent radical of formula $$\text{—}RN\text{—}A_1\text{—}NR'\text{—} \qquad (2a),$$

wherein $A_1$ is the bivalent radical of a polyalkylene glycol or is a linear or branched alkylene radical having from 2 to 24 carbon atoms and each of R and R' independently of the other is hydrogen or unsubstituted or substituted $C_1$–$C_6$alkyl or, in the case of the amino group that terminates the copolymer fragment, may also be a direct, ring-forming bond;

T is a bivalent radical of formula

$$(2)$$

wherein X is a bivalent aliphatic, cycloaliphatic, aliphatic-cycloaliphatic, aromatic, araliphatic or aliphatic-heterocyclic radical; and B is a radical of formula $$\text{—}R_1N\text{—}B_1\text{—}NR_1'\text{—} \qquad (2b),$$

wherein each of $R_1$ and $R_1'$ independently of the other has the meanings given above for R, $B_1$ is a bivalent aliphatic, cycloaliphatic, aliphatic-cycloaliphatic, aromatic or araliphatic hydrocarbon radical that is interrupted by at least one amine group of formula

$$(3)$$

and $R_2$ is hydrogen, a radical Q mentioned above or a radical of formula $$Q\text{—}CP'\text{—} \qquad (4),$$

wherein

Q is as defined above, and CP' is a bivalent copolymer fragment independently consisting of at least two of the above-mentioned segments A, B and T; with the provisos that in the copolymer fragments CP and CP' a segment A or B is followed by a segment T in each case;

that in the copolymer fragments CP and CP' a segment T is followed by a segment A or B in each case;

that the radical Q in formulae (1) and (4) is bonded to a segment A or B in each case; and that the N atom in formula (3) is bonded to a segment T when $R_2$ is a radical of formula (4).

Q is, for example, an olefinically unsaturated, copolymerisable radical that is bonded to the amine nitrogen —NR—, —NR'—, —NR$_1$— or —NR$_1$'— in a suitable manner, for example directly, by way of a functional group or by way of a bridge member, or that together with —NR—, —NR'—, —NR$_1$— or —NR$_1$'— forms a cyclic ring; in the latter case, R, R', $R_1$ or $R_1'$ is a direct, ring-forming bond.

The radical Q corresponds, for example, to a radical $R_3$ mentioned hereinbelow or to a radical of formula

$$(5)$$

wherein $Q_1$ is, for example, a radical of formula

$$(5a)$$

$$(5b)$$

$$(5c)$$

$$(5d)$$

$$(5e)$$

and wherein

Z is linear or branched $C_2$–$C_{12}$alkylene, $R_3$ is an olefinically unsaturated copolymerisable radical having from 2 to 24 carbon atoms which may be further substituted, W is a $C_2$–$C_{12}$alkylene radical, phenylene radical or $C_7$–$C_{12}$aralkylene radical, each of $R_4$ and $R_4'$ independently of the other is hydrogen, $C_1$–$C_4$alkyl or halogen, $R_5$ is a bivalent aliphatic, cycloaliphatic, aliphatic-cycloaliphatic, aromatic or araliphatic hydrocarbon radical, $R_6$ is hydrogen or $C_1$–$C_4$alkyl, each of alk and alk' independently of the other is a linear or branched $C_1$–$C_{12}$alkylene radical, each of m and n independently of the other is the number 0 or 1, Z" is $C_1$–$C_6$alkylene and $P_1$ independently is a radical of the above-mentioned formula (5) wherein $Q_1$ is a radical of the above formula (5a), (5b), (5c) or (5e) and n independently is as defined above.

Z is preferably linear or branched $C_2$–$C_8$alkylene, more preferably linear $C_2$–$C_6$alkylene and most preferably linear $C_2$–$C_4$alkylene. In a preferred embodiment of the invention, Z is 1,3-propylene or, especially, 1,2-ethylene.

Suitable substituents on the olefinic $C_2$–$C_{24}$ radical $R_3$ are, for example, $C_1$–$C_4$alkoxy, halogen, phenyl or carboxy.

$R_3$ is, for example, a radical of formula

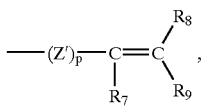

(6)

wherein p is the number 0 or 1, $R_7$ is hydrogen, $C_1$–$C_4$alkyl or halogen, each of $R_8$ and $R_9$ independently of the other is hydrogen, $C_1$–$C_4$alkyl, phenyl, carboxy or halogen, and Z' is linear or branched $C_1$–$C_{12}$alkylene or unsubstituted or $C_1$–$C_4$alkyl- or $C_1$–$C_4$alkoxy-substituted phenylene or $C_7$–$C_{12}$aralkylene.

When Z' is a phenylene radical, it is, for example, unsubstituted or methyl- or methoxy-substituted 1,2-, 1,3- or 1,4-phenylene. Preferably, Z' as a phenylene radical is 1,3- or 1,4-phenylene.

When Z' is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

Z' is preferably unsubstituted or methyl- or methoxy-substituted phenylene or phenylene-methylene or $C_1$–$C_{12}$alkylene, more preferably 1,3- or 1,4-phenylene or $C_1$–$C_6$alkylene, especially $C_1$–$C_2$alkylene and most preferably methylene.

p is the number 1 or, preferably, the number 0.

$R_7$ is preferably hydrogen, methyl or chlorine and most preferably hydrogen or methyl.

Each of $R_8$ and $R_9$ independently of the other is preferably hydrogen, carboxy, chlorine, methyl or phenyl. In a preferred embodiment of the invention, $R_8$ is hydrogen, chlorine, methyl or phenyl and $R_9$ is hydrogen or carboxy. Most preferably, $R_8$ and $R_9$ are each hydrogen.

Examples of suitable radicals $R_3$ are vinyl, 2-propenyl, allyl, 2-butenyl, o-, m- or p-vinyl-phenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Especially preferred radicals $R_3$ correspond to formula (6) wherein p is 0, $R_7$ is hydrogen or methyl, $R_8$ is hydrogen, methyl, chlorine or phenyl and $R_9$ is hydrogen or carboxy.

Other especially preferred radicals $R_3$ correspond to the above formula (6) wherein p is 1, Z' is 1,3- or 1,4-phenylene or $C_1$–$C_6$alkylene, especially $C_1$–$C_2$alkylene, $R_7$ is hydrogen or methyl and $R_8$ and $R_9$ are each hydrogen.

Z'' is preferably $C_1$–$C_4$alkylene, especially methylene or 1,1-dimethylmethylene.

One group of suitable radicals Q corresponds to the above formula (5) wherein n is 0 and $Q_1$ is a radical of the above formula (5a) wherein m is 0 and for $R_3$ the meanings and preferences given above apply.

A second group of suitable radicals Q corresponds to the above formula (5) wherein n is 1 and $Q_1$ is a radical of the above formula (5a) wherein m is 0 and for $R_3$ and Z the meanings and preferences given above apply.

A further group of suitable radicals Q corresponds to the above formula (5) wherein n is 1 and $Q_1$ is a radical of the above formula (5a) wherein m is 1 and for $R_3$ and Z the meanings and preferences given above apply.

A further group of suitable radicals Q corresponds to the above formula (5) wherein n is 0 and $Q_1$ is a radical of the above formula (5e) wherein for $R_3$ and Z'' the meanings and preferences given above apply.

In formulae (5b) and (5c), the variable W is preferably a $C_2$–$C_6$alkylene radical or a 1,3- or 1,4-phenylene radical and most preferably a $C_2$–$C_3$alkylene radical. Each of $R_4$ and $R_4'$ independently of the other is preferably hydrogen, methyl or chlorine. Most preferably, each of $R_4$ and $R_4'$ independently of the other is hydrogen or methyl.

In formula (5d), $R_5$ is, for example, linear or branched $C_3$–$C_{18}$alkylene or unsubstituted or $C_1$–$C_4$alkyl- or $C_1$–$C_4$alkoxy-substituted $C_6$–$C_{10}$arylene, $C_7$–$C_{18}$aralkylene, $C_6$–$C_{10}$ arylene-$C_1$–$C_2$alkylene-$C_6$–$C_{10}$ arylene, $C_3$–$C_8$cycloalkylene, $C_3$–$C_8$cycloalkylene-$C_1$–$C_6$alkylene, $C_3$–$C_8$cycloalkylene-$C_1$–$C_2$alkylene-$C_3$–$C_8$cycloalkylene, $C_1$–$C_6$alkylene-$C_3$–$C_8$cycloalkylene-$C_1$–$C_6$alkylene or an aliphatic-heterocyclic radical comprising at least one hydantoin group.

$R_5$ as alkylene is preferably a linear or branched $C_3$–$C_{14}$alkylene radical, more preferably a linear or branched $C_4$–$C_{12}$alkylene radical and most preferably a linear or branched $C_6$–$C_{10}$-alkylene radical. Some preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5 or 2,2,6-trimethyl-1,7-heptylene, 1,8-octylene, 2,2-dimethyl-1,8-octylene and 2,2,3- or 2,2,4- or 2,2,5- or 2,2,6- or 2,2,7-trimethyl-1,8-octylene.

When $R_5$ is arylene, it is, for example, naphthylene or especially phenylene, each of which may be substituted, for example, by $C_1$–$C_4$alkyl or by $C_1$–$C_4$alkoxy. Preferably, $R_5$ as arylene is 1,3- or 1,4-phenylene that is substituted by $C_1$–$C_4$alkyl or by $C_1$–$C_4$alkoxy in the ortho-position to at least one linkage site. Examples of substituted arylene are 1-methyl-2,4-phenylene, 1,5-dimethyl-2,4-phenylene, 1-methoxy-2,4-phenylene and 1-methyl-2,7-naphthylene.

$R_5$ as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene. Some examples are 1,3- or 1,4-benzylene, naphth-2-yl-7-methylene, 6-methyl-1,3- or -1,4-benzylene and 6-methoxy-1,3- or -1,4-benzylene.

When $R_5$ is cycloalkylene, it is preferably $C_5$–$C_6$cycloalkylene and most preferably cyclohexylene that is unsubstituted or substituted by methyl. Some examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene and 2,4-dimethyl-1,4-cyclohexylene.

When $R_5$ is cycloalkylene-alkylene, it is preferably cyclopentylene-$C_1$–$C_4$alkylene and especially cyclohexylene-$C_1$–$C_4$alkylene, each unsubstituted or mono- or poly-substituted by $C_1$–$C_4$alkyl, especially methyl. More preferably, the group cycloalkylene-alkylene is cyclohexylene-ethylene and, most preferably, cyclohexylene-methylene, each unsubstituted or substituted in the cyclohexylene radical by from 1 to 3 methyl groups. Some examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1-yl-3 or -4-methylene and 3,4,5- or 3,4,4- or 3,5,5-trimethyl-cyclohex-1 -yl-3- or -4-methylene.

When $R_5$ is alkylene-cycloalkylene-alkylene, it is preferably $C_1$–$C_4$alkylene-cyclopentylene-$C_1$–$C_4$alkylene and especially $C_1$–$C_4$alkylene-cyclohexylene-$C_1$–$C_4$alkylene, each unsubstituted or mono- or poly-substituted by $C_1$–$C_4$alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups. Some examples are cyclopentane-1,3-dimethylene, 3-methyl-cyclopentane-1,3-dimethylene, 3,4-dimethyl-cyclopentane-1,3-dimethylene, 3,4,4-trimethyl-cyclopentane-1,3-dimethylene, cyclohexane-1,3- or -1,4-dimethylene, 3- or 4- or 5-methyl-cyclohexane-1,3- or -1,4-dimethylene, 3,4- or 3,5-dimethylcyclohexane-1,3- or -1,4-dimethylene, 3,4,5- or 3,4,4- or 3,5,5-trimethyl-cyclohexane-1,3- or -1,4-dimethylene.

$R_5$ as $C_3$–$C_8$cycloalkylene-$C_1$–$C_2$alkylene-$C_3$–$C_8$cycloalkylene or $C_6$–$C_{10}$arylene-$C_1$–$C_2$alkylene-$C_6$–$C_{10}$arylene is preferably $C_5$–$C_6$cycloalkylene-methylene-$C_5$–$C_6$cycloalkylene or phenylene-methylene-phenylene, each of which may be unsubstituted or substituted in the cycloalkyl or phenyl ring by one or more methyl groups.

When $R_5$ is an aliphatic-heterocyclic radical containing hydantoin groups, it may correspond, for example, to formula

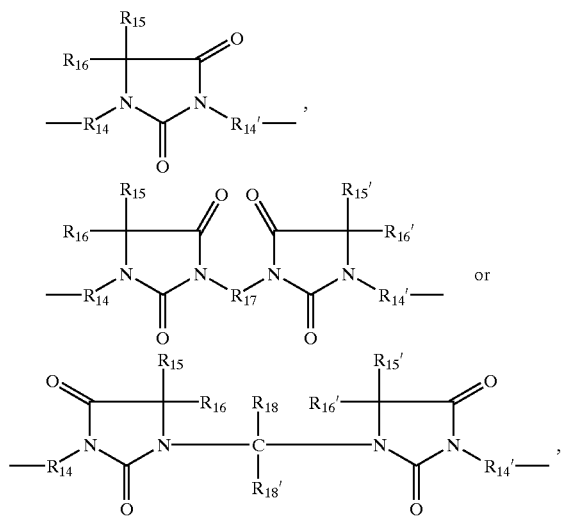

wherein $R_{14}$ and $R_{14}'$ are each $C_1$–$C_6$alkylene, preferably $C_2$–$C_4$alkylene and especially $C_2$–$C_3$alkylene, $R_{15}$, $R_{15}'$ and $R_{16}'$ are each independently of the others hydrogen, $C_1$–$C_6$alkyl or $C_5$–$C_7$cycloalkyl, preferably are each independently of the others hydrogen or $C_1$–$C_4$alkyl and especially are each methyl, $R_{15}$ C is $C_1$–$C_{12}$alkylene and preferably $C_1$–$C_6$-alkylene and $R_{16}$ and $R_{16}'$ are each independently of the other hydrogen or $C_1$–$C_4$alkyl and preferably hydrogen or methyl.

The radical $R_5$ in formula (5d) has a symmetrical or, preferably, an asymmetrical structure.

A preferred group of radicals $Q_1$ of formula (5d) comprises those wherein $R_5$ is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl.

The bivalent radical $R_5$ is derived preferably from a diisocyanate and most preferably from a diisocyanate selected from the group isophorone diisocyanate (IPDI), toluylene-2,4-diisocyanate (TDI), 4,4'-methylenebis (cyclohexyl isocyanate), 1,6-diisocyanato-2,2,4-trimethyl-n-hexane (TMDI), methylenebis(phenyl isocyanate), methylenebis(cyclohexyl-4-isocyanate) and hexamethylene diisocyanate (HMDI).

Each of the radicals alk and alk' independently of the other is preferably a $C_2$–$C_8$alkylene radical, more preferably a $C_2$–$C_4$alkylene radical and most preferably the 1,2-ethylene radical.

$R_6$ is preferably methyl or especially hydrogen.

$P_1$ is a radical of the above formula (5) wherein 01 is a radical of the above formula (5a), (5b) or (5c), and wherein for the variables contained therein the meanings and preferences given above apply in each case.

$P_1$ is preferably a radical of the above formula (5) wherein $Q_1$ is a radical of the above formula (5a), and most preferably is a radical of formula (5') or (5''') given below.

When Q is a radical $R_3$, the meaning and preferences given above for $R_3$ apply in each case.

When Q together with —N—R—, —N—R'—, —NR$_1$'— or —NR$_1$'—forms a cyclic ring comprising at least one crosslinkable group, it is in each case, for example, a radical of formula

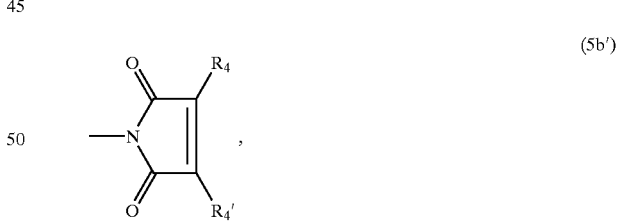

(5b')

wherein each of $R_4$ and $R_4'$ is as defined above and preferably each is methyl.

Especially preferred radicals Q correspond to formula (5')

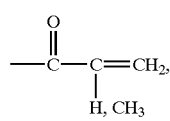

-continued

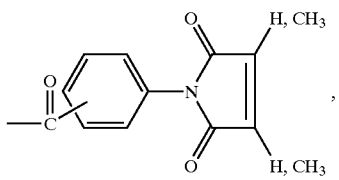  (5")

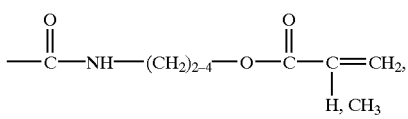  (5''')

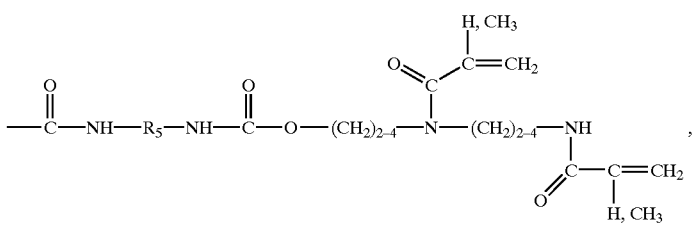  (5'''')

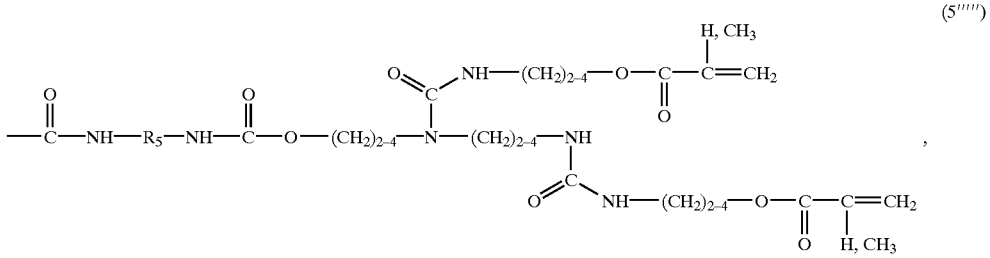  (5''''')

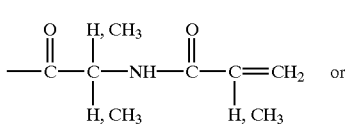  or  (5*)

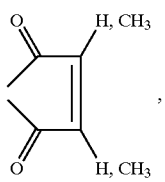  (5b")

wherein for $R_5$ the meanings and preferences given above apply in each case.

Especially preferred as the radical Q are radicals of the above formulae (5') and (5''').

Each of R and R' independently of the other is, for example, hydrogen or unsubstituted or, for example, hydroxy- or $C_1$–$C_4$alkoxy-substituted $C_1$–$C_6$alkyl, preferably hydrogen or unsubstituted or hydroxy-substituted $C_1$–$C_4$alkyl, more preferably hydrogen, $C_1$–$C_2$alkyl or hydroxy-$C_1$–$C_2$alkyl and most preferably hydrogen. The radicals R and R' may be different or, preferably, identical.

When the radical $A_i$ is a polyalkylene glycol radical, it may correspond, for example, to formula

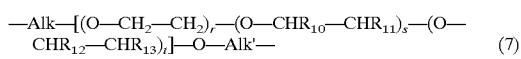  (7)

wherein each of (Alk) and (Alk)' independently of the other is a linear or branched, unsubstituted or, for example, hydroxy-substituted $C_1$–$C_{12}$alkylene radical; one of the radicals $R_{10}$ and $R_{11}$ is hydrogen and the other is methyl; one of the radicals $R_{12}$ and $R_{13}$ is hydrogen and the other is $C_2$–$C_4$alkyl; and each of r, s and t independently of the others is a number from 0 to 100, the sum of (r+s+t) being from 1 to 100.

In formula (7), each of (Alk) and (Alk') independently of the other is preferably linear or branched $C_2$–$C_8$alkylene, more preferably linear or branched $C_2$–$C_6$alkylene and most preferably linear or branched $C_2$–$C_4$alkylene. Examples of especially preferred radicals (Alk) and (Alk') are 1,2-ethylene, 1,2-propylene and 1,3-propylene. The radicals (Alk) and (Alk') may be different or, preferably, identical.

Each of r, s and t independently of the others is preferably a number from 0 to 80, the sum of (r+s+t) being from 2 to 80. Most preferably, each of r, s and t independently of the others is a number from 0 to 50, the sum of (r+s+t) being from 4 to 50 and especially from 8 to 50.

Of the radicals $R_{12}$ and $R_{13}$ one is hydrogen and the other is preferably ethyl.

Preferred embodiments of the -polyalkylene glycol radicals $A_1$ are:
(i) a radical of formula (7) wherein each of (Alk) and (Alk') independently of the other is linear or branched $C_2$–$C_6$alkylene, t is 0, and each of r and s independently of the other is a number from 0 to 100, the sum of (r+s) being from 1 to 100; preferably from 0 to 80, the sum of (r+s) being from 2 to 80; and most preferably from 0 to 50, the sum of (r+s) being from 4 to 50 or especially from 8 to 50;

(ii) a radical of formula (7) wherein (Alk) and Alk') are identical and each is linear or branched $C_2$–$C_4$alkylene, s and t are each 0 and r is a number from 1 to 100, preferably from 2 to 80, more preferably from 4 to 50 and most preferably from 8 to 50.

When A is an alkylene radical, it is preferably an unsubstituted or hydroxy-substituted $C_2$–$C_{12}$alkylene radical, more preferably an unsubstituted or hydroxy-substituted $C_2$–$C_8$-alkylene radical and most preferably a $C_2$–$C_6$alkylene radical, which may in each case be branched or, preferably, linear. Examples of suitable alkylene segments A are 1,2-ethylene, 1,2- or 1,3-propylene, 2-hydroxy-1,3-propylene, 1,4-butylene, 1,5-pentylene and 1,6-hexylene.

Preferred embodiments of the segments A according to the invention are:

(i) a bivalent radical of formula (2a) wherein R and R' are each hydrogen or $C_1$–$C_4$alkyl and $A_1$ is a bivalent polyalkylene glycol radical of formula

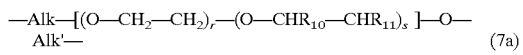
—Alk—[(O—CH$_2$—CH$_2$)$_r$—(O—CHR$_{10}$—CHR$_{11}$)$_s$]—O—Alk'—  (7a)

wherein (Alk) and (Alk') are identical and each is linear or branched $C_2$–$C_6$alkylene, one of the radicals $R_{10}$ and $R_{11}$ is hydrogen and the other is methyl, and each of r and s independently of the other is a number from 0 to 80 and especially from 0 to 50, the sum of (r+s) being from 2 to 80, preferably from 4 to 50 and most preferably from 8 to 50;

(ii) a bivalent radical of formula (2a) wherein R and R' are each hydrogen and $A_1$ is a bivalent polyalkylene glycol radical of formula

—Alk—(O—CH$_2$CH$_2$)$_r$—O—Alk'—  (7b)

wherein (Alk) and (Alk') are identical and each is linear or branched $C_2$–$C_4$alkylene, and r is a number from 4 to 50 and especially from 8 to 50;

(iii) a bivalent radical of formula (2a) wherein R and R' are each hydroxy-substituted $C_1$–$C_4$-alkyl and $A_1$ is a $C_2$–$C_6$alkylene radical.

The compositions of block copolymers, e.g. the polymer fragments of formulae (7) and (7a), mentioned in the text always correspond in each case to a mean statistical composition. This means that block copolymer radicals having alternating units, having repeating identical units or having a mixture of alternating and repeating units are included, provided that the ultimate mean statistical composition complies with the specified parameters.

The prepolymers of the invention may have uniform segments A or, alternatively, two or more structurally different segments A, for example 2 or 3 or, preferably, 2 different segments A.

With regard to the segments T of formula (2) according to the invention, for X independently the meanings and preferences given above for $R_5$ apply. Accordingly, in a preferred embodiment of the invention, X is derived from an aliphatic, cycloaliphatic, aliphatic-cycloaliphatic, aromatic or araliphatic diisocyanate, especially from a diisocyanate selected from the group isophorone diisocyanate (IPDI), toluylene-2,4-diisocyanate (TDI), methylenebis(cyclohexyl isocyanate), 1,6-diisocyanato-2,2,4-trimethyl-n-hexane (TMDI), methylenebis(phenyl isocyanate), methylenebis (cyclohexyl isocyanate) and hexamethylene diisocyanate (HMDI).

The prepolymers of the invention may have uniform segments T or, alternatively, two or more structurally different segments T. Preferably, the prepolymers contain uniform segments T.

Each of $R_1$ and $R_1'$ independently of the other is preferably hydrogen or unsubstituted or, for example, hydroxy- or $C_1$–$C_4$alkoxy-substituted $C_1$–$C_6$alkyl, preferably hydrogen or unsubstituted or hydroxy-substituted $C_1$–$C_4$alkyl, more preferably hydrogen, $C_1$–$C_2$alkyl or hydroxy-$C_1$–$C_2$alkyl and most preferably hydrogen. The radicals $R_1$ und $R_1'$ may be different or, preferably, identical. In a preferred embodiment of the invention, R, R', $R_1$ and $R_1'$ each have the same meaning and are especially hydrogen.

The radical $B_1$ may be, for example, linear or branched $C_3$–$C_{24}$alkylene or unsubstituted or $C_1$–$C_4$alkyl-substituted $C_6$–$C_{10}$arylene, $C_7$–$C_{18}$aralkylene, $C_6$–$C_{10}$arylene-$C_1$–$C_2$alkylene-$C_6$–$C_{10}$-arylene, $C_3$–$C_8$cycloalkylene, $C_3$–$C_8$cycloalkylene-$C_1$–$C_6$alkylene, $C_3$–$C_8$cycloalkylene-$C_1C_2$-alkylene-$C_3$–$C_8$cycloalkylene or $C_1$–$C_6$alkylene-$C_3$–$C_8$cycloalkylene-$C_1$–$C_6$alkylene, each of which is interrupted by at least one group —N($R_2$)— of formula (3), preferably by from 1 to 3 or especially 1 or 2 identical or different groups of formula (3), more preferably by 1 or 2 identical groups of formula (3) or most preferably by 1 group of formula (3).

Preferably, the radical $B_1$ is a linear or branched $C_4$–$C_{24}$alkylene radical that is interrupted by from 1 to 3 groups, preferably 1 or 2 groups and especially by one group of the above formula (3).

Especially preferred as the radical $B_1$ is linear or branched alkylene having from 3 to 14 or especially from 4 to 12 carbon atoms that is interrupted by one group of formula (3).

When $R_2$ is a radical 0 or a radical of formula (4), then, for the segments A, B and T contained therein and for the variable Q, the meanings, preferences and conditions given above apply in each case.

One group of preferred radicals $B_1$ corresponds to formula

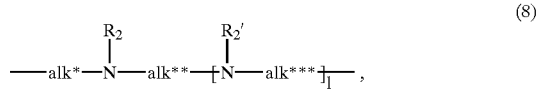
 (8)

wherein each of alk*, alk and alk* independently of the others is a $C_2$–$C_{12}$alkylene radical, preferably a $C_2$–$C_6$alkylene radical and most preferably a $C_2$–$C_4$alkylene radical; I is the number 0 or 1 and especially the number 0 and for $R_2$ and $R_2'$ independently the meanings and preferences given above for $R_2$ apply in each case.

The prepolymers according to the invention may have uniform segments B or, alternatively, two or more structurally different segments B. Preferably, the prepolymers contain one or more different segments B of formula

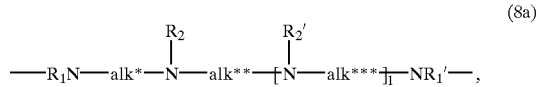
 (8a)

wherein for $R_1$, $R_1'$, $R_2$, $R_2'$, alk*, alk, alk* and I the meanings and preferences given above apply in each case.

When the prepolymers contain different segments B, they are preferably in the form of a mixture of 2, 3 or more different segments of the above formula (8a) that are identical with regard to $R_1$, $R_1'$, alk*, alk, alk* and I but differ with regard to the variables $R_2$ and/or $R_2'$. One example is a mixture of two or more different segments of formula (8a) wherein I is 0 in each case, $R_1$, $R_1'$, alk* and alk** are in each case identical and have one of the meanings given above, and wherein $R_2$ in the different segments has in each case a meaning that differs from the others, selected from the group consisting of radical -CP', radical -Q and hydrogen.

Alternatively, there also come into consideration, for example, different segments B that differ with regard to alk*, alk**, $R_1$ and/or $R_1'$.

The number of segments A in the polymer fragments CP and CP' is preferably greater than the number of segments B. The number of segments A and B in the polymer fragments CP and CP' is preferably in a ratio of 1:0.01 to 0.5, preferably 1:0.05 to 0.4 and most preferably 1:0.1 to 0.25.

The average molecular weight of the polymer fragments CP is, for example, in a range of approximately from 350 to 25,000, preferably from 500 to 10,000 and most preferably from 1000 to 5000.

In a preferred embodiment of the invention, the polymer fragment CP is terminated on both sides by a segment A. It is furthermore preferred that any polymer fragments CP' that are present are also terminated by a segment A.

The prepolymers of formula (1) can be prepared in a manner known per se, for example by reacting together a compound of formula

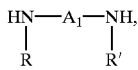  (10)

a compound of formula

O=C=N—X—N=C=O  (11), and a compound of formula

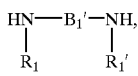  (12)

wherein for $A_1$, R, R', $R_1$, $R_1'$ and X the meanings and preferences given above apply in each case and for $B_1'$ independently the meanings and preferences given above for $B_1$ apply, except that $R_2$ in the amine groups of formula (3) is in each case hydrogen, and reacting the copolymer so obtainable of formula H—CP*—H  (1a), wherein CP* independently has the meanings given above for CP, except that $R_2$ in the segments B is hydrogen or a radical —CP'—NR"H and R" independently has the meanings given above for R, with a compound of formula

Y—$Q_1$  (13), wherein $Q_1$ is as defined above and Y is, for example, halogen, e.g. bromine or especially chlorine; a carboxyl group —COOH; a suitable carboxyl group derivative, e.g. a group —COOR$_{19}$, wherein R$_{19}$ is, for example, phenyl or $C_1$–$C_4$alkyl, —CO—Hal, wherein Hal is halogen, e.g. —COBr or especially —COCl; or a group —N=C=O, or wherein $Q_1$ together with Y forms a heterocyclic compound containing, for example, an oxygen atom as hetero atom.

The compounds of formulae (10), (11) and (12) are known compounds or can be obtained by methods known perse. Examples of suitable compounds of formula (10) are N,N'-dihydroxyalkyl-alkylenediamines, e.g. N,N'-dihydroxyethyl-$C_2$–$C_6$alkylenediamines, or preferably bis-aminoalkylene-polyalkylene glycols of various average molecular weights, e.g. so-called Jeffamines having an average molecular weight of, for example, approximately from 200 to 5000, e.g. bis(2-aminopropyl)polyethylene glycol 500 to approximately 2000 or bis(2-aminoethyl)polyethylene glycol 1000 to approximately 3400. Suitable diisocyanates of formula (11) are, for example, isophorone diisocyanate (IPDI), toluylene-2,4-diisocyanate (TDI), methylenebis(cyclohexyl isocyanate), 1,6-diisocyanato-2,2,4-trimethyl-n-hexane (TMDI), methylenebis(phenyl isocyanate), methylenebis(cyclohexyl isocyanate) and hex-amethylene diisocyanate (HMDI). Examples of suitable compounds of formula (12) are polyamines, e.g. symmetrical or asymmetrical dialkylenetriamines or trialkylenetetramines, e.g. diethylenetriamine, N-2'-aminoethyl-1,3-propylenediamine, N,N-bis(3-aminopropyl)-amine, N,N-bis(6-aminohexyl)amine or triethylenetetramine. It is possible to use in the process, for example, one compound each of formulae (10), (11) and (12) or two or more different compounds of formula(e) (10), (11) and/or (12), there being obtained in the latter case product mixtures of several copolymers of formula (1a). One advantageous variant comprises, for example, reacting two or more different compounds of formula (10) with one compound each of formulae (11) and (12).

The reaction of the diamine of formula (10), the polyamine of formula (12) and the diisocyanate of formula (11) is advantageously carried out in an aqueous or aqueous-organic medium. A suitable medium has been found to be especially a mixture of water and a readily water-soluble organic solvent, e.g. an alkanol, such as methanol, ethanol or isopropanol, a cyclic ether, such as tetrahydrofuran, or a ketone, such as acetone. An especially suitable reaction medium is a mixture of water and a readily water-soluble solvent having a boiling point of from 50 to 85° C., preferably from 50 to 70° C., especially a water/-tetrahydrofuran or a water/acetone mixture.

The reaction temperature in the first reaction step of the process is, for example, from −5 to 50° C., preferably from 0 to 30° C. and most preferably from 2 to 10° C.

The reaction times may vary within wide limits, a time of approximately from 1 to 10 hours, preferably from 2 to 8 hours and most preferably 2 to 3 hours having proved practicable.

The stoichiometry in the reaction of the compounds of formulae (10), (11) and (12) is advantageously so selected that the number of molar equivalents of the amine groups contained in the compounds of formulae (10) and (12) is greater than the number of molar equivalents of the isocyanato groups contained in the compounds of formula (11). For example, the excess of amine groups in the compounds of formulae (10) and (12) in relation to the isocyanato groups in the compounds of formula (11) is from 0.02 to 1 molar equivalent, preferably from 0.05 to 0.8 molar equivalent, more preferably from 0.1 to 0.6 molar equivalent and most preferably from 0.2 to 0.4 molar equivalent.

It is furthermore preferred that the diamine of formula (10) is used in a molar excess in relation to the polyamine of formula (12). A molar ratio of the diamine of formula (10)

to the polyamine of formula (12) of from 1:0.01 to 1:0.5, preferably from 1:0.05 to 1:0.4 and most preferably from 1:0.1 to 1:0.3 has proved especially advantageous.

If, as is preferred, the compound of formula (12) is a triamine, the compounds of formulae (10), (12) and (11) are used, for example, in a molar ratio of 1 equivalent of compound of formula (10), from 0.05 to 0.4 equivalent of compound of formula (12) and from 0.7 to 1.6 equivalents of compound of formula (11); preferably 1 equivalent of compound of formula (10), from 0.1 to 0.3 equivalent of compound of formula (12) and from 0.85 to 1.35 equivalents of compound of formula (11); and most preferably 1 equivalent of compound of formula (10), approximately 0.2 equivalent of compound of formula (12) and from 1.1 to 1.2 equivalents of compound of formula (11).

The isolation and purification of the copolymers of formula (1a) obtainable according to the first reaction step can be carried out in a manner known per se, for example by extraction, distillation, filtration, ultrafiltration or chromatographic methods.

The copolymers of formula (1a) are novel and the invention relates to them also. They are generally liquid or readily meltable compounds that are predominantly water-soluble. The average molecular weight of the copolymers of formula (1a) may vary within wide limits, but is advantageously, for example, from 350 to 25,000, preferably from 500 to 10,000 and most preferably from 1000 to 5000.

The reaction solution containing a copolymer of formula (1a) which is obtainable according to the first reaction step can be reacted with a compound of formula (13) to form a prepolymer of formula (1) without being purified or after purification by means of a customary method, e.g. by means of ultrafiltration. Advantageously, for example, from 0.1 to 1.5 molar equivalents, preferably from 0.2 to 1 molar equivalent and most preferably from 0.25 to 0.6 molar equivalent of compound of formula (13), based in each case on 1 molar equivalent of compound of formula (1a), are used in the process.

The compounds of formula (13) are in most cases known or can be prepared by methods known per se. Examples of preferred compounds of formula (13) are allyl chloride or bromide, acryloyl chloride, methacryloyl chloride, cinnamic acid chloride, maleic acid anhydride, mono- or di-methylmaleic acid anhydride, 2-isocyanatoethyl acrylate or 2-isocyanatoethyl methacrylate.

A group of novel compounds of formula (13) corresponds to formula

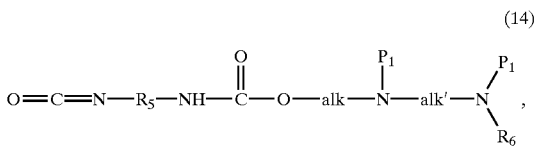

wherein for $R_5$, $R_6$, $P_1$, alk and alk' the meanings and preferences given above apply in each case.

Preferred as compounds of formula (14) are those of formula

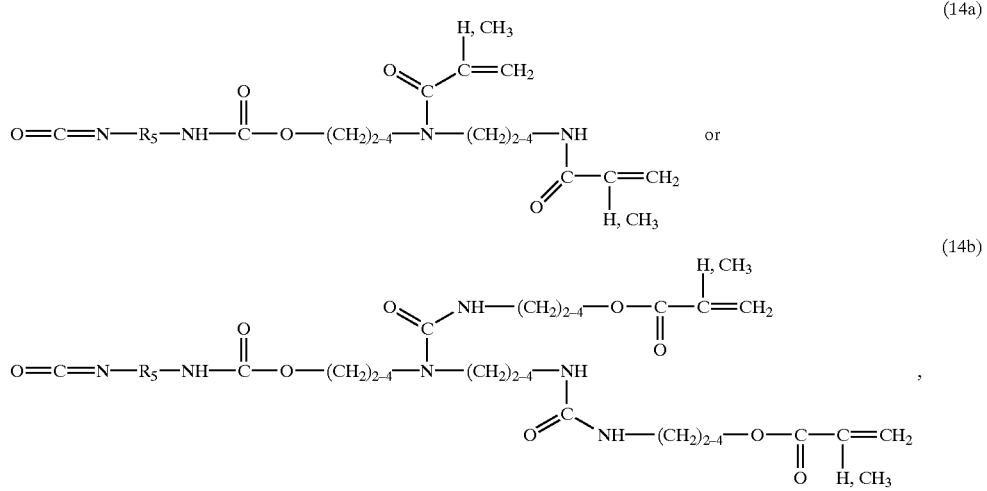

wherein for $R_5$ the meanings and preferences given above apply in each case.

The compounds of formula (14) can be prepared in a manner known per se, for example by reacting a diisocyanate, which may, if desired, be mono-masked, of formula

wherein $R_5$ is as defined above, with a compound of formula

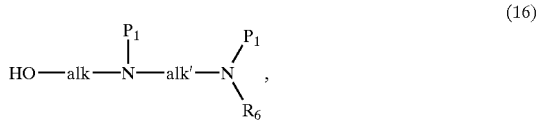

wherein $R_6$, $P_1$, alk and alk' are each as defined above, in an inert solvent. It is especially advantageous to use here diisocyanates having isocyanate groups of differing reactivity since the formation of isomers and diadducts can thereby be substantially suppressed. The differing reactivity can be brought about, for example, by steric hindrance. In addition, the differing reactivity can also be achieved by masking an isocyanate group in the diisocyanate.

Masking agents are known from urethane chemistry. They may be, for example, phenols (cresol, xylenol), lactams (ε-caprolactam), oximes (acetoxime, benzophenone oxime), active-H methylene compounds (diethyl malonate, ethyl acetoacetate), pyrazoles or benzotriazoles. Masking agents are described, for example, by Z. W. Wicks, Jr. in Progress in Organic Coatings, 9 (1981), pages 3 to 28.

Suitable inert solvents for the reaction of the compound of formula (15) with a compound of formula (16) are aprotic, preferably polar, solvents, for example hydrocarbons (petroleum ether, methylcyclohexane, benzene, toluene, xylene), halogenated hydrocarbons (chloroform, methylene chloride, trichloroethane, tetrachloroethane, chlorobenzene), ethers (diethyl ether, dibutyl ether, ethylene glycol dimethyl ether, diethylene glycol dimethyl ether, tetrahydrofuran, dioxane), ketones (acetone, dibutyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulfones and sulfoxides (dimethyl sulfoxide, tetramethylenesulfone). Polar solvents are preferably used. The reactants are advantageously used in equimolar quantities. The reaction temperature may be, for example, from 0 to 200° C. When catalysts are used, the temperatures may advantageously be in the range of from 0 to 50° C., preferably at room temperature. Suitable catalysts are, for example, metal salts, such as alkali metal salts of carboxylic acids, tertiary amines, for example $(C_1–C_6alkyl)_3N$ (triethylamine, tri-n-butylamine), N-methylpyrrolidine, N-methylmorpholine, N,N-dimethylpiperidine, pyridine and 1,4-diazabicyclooctane. Tin salts have been found to be especially effective, especially alkyltin salts of carboxylic acids, for example dibutyltin dilaurate and tin dioctoate. The isolation and purification of the compounds prepared is carried out according to known methods, for example by means of extraction, crystallisation, recrystallisation or chromatographic purification methods.

The compounds of formula (15) are known or can be prepared by methods known per se. The compounds of formula (16) are novel and the invention relates to them also. They can be prepared, for example, by reacting approximately 1 molar equivalent of a compound of formula

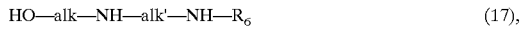

$$HO—alk—NH—alk'—NH—R_6 \quad (17),$$

wherein $R_6$, alk and alk' are each as defined above, with approximately 2 molar equivalents of a compound of formula

$$Y—Q_1' \quad (13a),$$

wherein Y is as defined above and $Q_1'$ is a radical of the above formula (5a), (5b) or (5c), preferably (5a).

The reaction of the copolymers of formula (1a) with a compound of formula (13) and the reaction of the compound of formula (17) with a compound of formula (13a) are carried out, where the compounds of formulae (13) and (13a) are carboxylic acid derivatives and, especially, carboxylic acid halides, under the conditions that are customary for amide formation, for example at temperatures of, for example, from 0 to 80° C., preferably from 0 to 50° C. and most preferably from 0 to 25° C., in a dipolar aprotic solvent, e.g. tetrahydrofuran, dioxane, DMSO etc., or in a mixture of water and one of the mentioned solvents, in the presence of a base, e.g. an alkali metal hydroxide, and, where applicable, in the presence of a stabiliser. Suitable stabilisers are, for example, 2,6-dialkylphenols, hydroquinone derivatives, e.g. hydroquinone or hydroquinone monoalkyl ethers, or N-oxides, e.g. 4-hydroxy-2,2,6,6-tetramethyl-piperidin-1-yl. The reaction times may vary within wide limits, a period of, for example, from 30 minutes to 12 hours, preferably from 1 to 6 hours and especially from 2 to 3 hours, generally having been found practicable.

Where the compounds of formulae (13) and (13a) are isocyanates, the reaction thereof with a copolymer of formula (1a) or with a compound of formula (17), respectively, can be carried out under the conditions given above for the reaction of the compounds of formulae (10), (11) and (12).

Where the compounds of formulae (13) and (13a) are alkyl halides, the reaction thereof with a copolymer of formula (1a) or with a compound of formula (17), respectively, can be carried out, for example, under the conditions that are customary for the alkylation of amines.

Where the compounds of formulae (13) and (13a) are heterocyclic compounds, they may be, for example, cyclic acid anhydrides, for example maleic acid anhydride, which can be converted in a manner known per se with a copolymer of formula (1a) or with a compound of formula (17), respectively, into a corresponding copolymer containing imide groups.

The prepolymers of the invention are crosslinkable, but are uncrosslinked or, at least, substantially uncrosslinked; in addition, they are stable, that is to say spontaneous crosslinking as a result of homopolymerisation does not take place.

The prepolymers of the invention are advantageously liquid or readily meltable or water-soluble; their average molecular weight may vary within wide limits. An average molecular weight of, for example, from 350 to 25,000, preferably from 500 to 10,000 and most preferably from 1000 to 5000 has proved advantageous for the prepolymers of the invention.

The prepolymers of formula (1) can be isolated and purified in a manner known per se, for example by extraction, precipitation, crystallisation, recrystallisation, filtration, ultrafiltration, chromatography, reverse osmosis or dialysis, with ultrafiltration being especially preferred. By means of that purification procedure the prepolymers of the invention can be obtained in extremely pure form, for example as solventless liquids or melts or as concentrated aqueous solutions that are free or at least substantially free of reaction products, such as salts, and starting materials or other non-polymeric constituents.

The preferred purification method for the prepolymers of the invention, ultrafiltration, can be carried out in a manner known per se. It is possible to carry out the ultrafiltration repeatedly, for example from two to ten times. Alternatively, the ultrafiltration can also be carried out continuously until the desired degree of purity is reached. The degree of purity selected may, in principle, be as high as desired and is preferably set in such a manner that the content of undesired constituents in the prepolymers is, for example, $\leq 0.001\%$ and more preferably $\leq 0.0001\%$ (1 ppm). The prepolymers may contain in addition, for example as a consequence of their synthesis, constituents that are acceptable from a physiological viewpoint, e.g. sodium chloride, such constituents advantageously being present in an amount of $\leq 1\%$, preferably $\leq 0.1\%$, and most preferably $\leq 0.01\%$.

The prepolymers of formula (1) according to the invention are, as already mentioned above, crosslinkable in a controlled and extremely effective manner, especially by photo-cross-linking.

The present invention further relates, therefore, to a polymer that can be obtained by photo-crosslinking of a prepolymer of formula (1), in the absence or presence of an additional vinyl comonomer. These crosslinked polymers are water-insoluble.

In the photo-crosslinking, a photoinitiator capable of initiating free-radical crosslinking is suitably added. Examples thereof will be familiar to the person skilled in the art, suitable photoinitiators that may specifically be mentioned being benzoin methyl ether, 1-hydroxycyclohexylphenyl ketone, Darocure 1173 or Irgacure types. The crosslinking can then be brought about by actinic radiation, e.g. UV light, or ionising radiation, e.g. gamma rays or X-rays.

The photo-polymerisation can be carried out without the addition of a solvent, for example when the prepolymer is a liquid or readily meltable prepolymer, or takes place in a suitable solvent. Suitable solvents are in principle all solvents that dissolve the polymers according to the invention and the vinyl comonomers which may be additionally used, e.g. water, alcohols, such as lower alkanols, e.g. ethanol or methanol, carboxylic acid amides, such as dimethylformamide, or dimethyl sulfoxide, and mixtures of suitable solvents, e.g. mixtures of water with an alcohol, e.g. a water/ethanol or a water/methanol mixture.

The photo-crosslinking is preferably effected under solventless or substantially solventless conditions or directly from an aqueous solution of the prepolymers according to the invention which can be obtained as a result of the preferred purification step, ultrafiltration, optionally after the addition of an additional vinyl comonomer. For example, photo-cross-linking of an approximately 15 to 90% aqueous solution can be carried out.

The process for the preparation of the crosslinked polymers of the invention comprises, for example, photo-crosslinking a prepolymer of formula (1), especially in substantially pure form, that is to say, for example, after single or repeated ultrafiltration, under solventless or substantially solventless conditions or in solution, especially in aqueous solution, in the absence or presence of an additional vinyl comonomer.

The vinyl comonomer that can additionally be used according to the invention in the photo-crosslinking may be hydrophilic or hydrophobic or may be a mixture of a hydrophobic and a hydrophilic vinyl monomer. Suitable vinyl monomers include especially those which are customarily used in the manufacture of contact lenses. The expression "hydrophilic vinyl monomer" is understood to mean a monomer that typically produces as homopolymer a polymer that is water-soluble or capable of absorbing at least 10% by weight water. Analogously, the expression "hydrophobic vinyl monomer" is understood to mean a monomer that typically produces as homopolymer a polymer that is water-insoluble or capable of absorbing less than 10% by weight water.

In general, approximately from 0.01 to 80 units of a typical vinyl comonomer react per prepolymer unit of formula (1).

The proportion of vinyl comonomers, if used, is preferably from 0.5 to 80 units per prepolymer unit of formula (1), especially from 1 to 30 units of vinyl comonomer per prepolymer unit of formula (1) and most preferably from 5 to 20 units per prepolymer unit of formula (1).

It is also preferred to use a hydrophobic vinyl comonomer or a mixture of a hydrophobic vinyl comonomer with a hydrophilic vinyl comonomer, the mixture containing at least 50% by weight of a hydrophobic vinyl comonomer. In that manner, the mechanical properties of the polymer can be improved without the water content being appreciably reduced. In principle, however, both conventional hydrophobic vinyl comonomers and conventional hydrophilic vinyl comonomers are suitable for copolymerisation with a prepolymer of formula (1).

Suitable hydrophobic vinyl comonomers include, without the following being an exhaustive list, $C_1$–$C_{18}$alkyl acrylates and methacrylates, $C_3$–$C_{18}$alkylacrylamides and -methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$—$C_{12}$alkyl esters of maleic acid, fumaric acid, itaconic acid, mesaconic acid and the like.

Preferred are, for example, $C_1$–$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethyl-thiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethyldisiloxane.

Suitable hydrophilic vinyl comonomers include, without the following being an exhaustive list, hydroxy-substituted lower alkyl acrylates and methacrylates, acrylamide, methacrylamide, lower alkylacrylamide and -methacrylamide, ethoxylated acrylates and methacrylates, hydroxy-substituted lower alkylacrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preferred are, for example, hydroxy-substituted $C_2$–$C_4$alkyl (meth)acrylates, five- to seven-membered N-vinyl lactams, N,N-di-$C_1$–$C_4$alkyl-(meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinylpyridine, vinylpyrrolidine, glycerol methacrylate, N-(1,1-dimethyl-3-oxobutyl)-acrylamide and the like.

Preferred hydrophobic vinyl comonomers are methyl methacrylate and vinyl acetate. Preferred hydrophilic vinyl comonomers are 2-hydroxyethyl methacylate, N-vinylpyrrolidone and acrylamide.

The prepolymers of the invention can be processed in a manner known per se to form mouldings, especially contact lenses, for example by carrying out the photo-crosslinking of the prepolymers of the invention in a suitable contact lens mould. The invention further relates, therefore, to mouldings that substantially consist of a prepolymer of the invention.

Further examples of mouldings of the invention, apart from contact lenses, are biomedical or special ophthalmic mouldings, e.g. intraocular lenses, eye dressings, mouldings for use membranes for controlling diffusion, photo-structurable films for information storage, or photoresist materials, e.g. membranes or mouldings for etch resists or screen print resists.

A preferred process for the manufacture of mouldings comprises the following steps:

a) introducing into a mould a prepolymer of formula (1) that is liquid at room temperature or readily meltable and that is substantially free of solvents, in the absence or presence of an additional vinyl comonomer and/or photoinitiator, b) causing photo-crosslinking for a period of $\leq 60$ minutes, c) opening the mould so that the moulding can be removed from the mould.

Another preferred process for the manufacture of mouldings comprises the following steps:

a) preparing a substantially aqueous solution of a water-soluble prepolymer of formula (1) in the absence or presence of an additional vinyl comonomer and/or photoinitiator, b) introducing the resulting solution into a mould, c) causing photo-crosslinking for a period of $\leq 60$ minutes, d) opening the mould so that the moulding can be removed from the mould.

In the preferred processes described above, it is especially preferred in each case to introduce the prepolymer in the absence of an additional vinyl comonomer. It is further preferred to introduce the prepolymer into the mould in the presence of a photoinitiator.

For introducing the prepolymers of the invention into a mould it is possible to use methods known per se, such as, especially, conventional metering in, e.g. dropwise introduction. Suitable vinyl comonomers, if present, will be the aforementioned comonomers in the amounts given. The vinyl comonomers that may be present are advantageously mixed with the prepolymer of the invention first and then introduced into the mould.

Appropriate moulds are made, for example, of polypropylene. Suitable materials for re-usable moulds are, for example, quartz, sapphire crystal or metals.

If the mouldings to be manufactured are contact lenses, they can be manufactured in a manner known per se, for example in a conventional spin-casting mould as described, for example, in U.S. Pat. 3,408,429, or by the full-mould process in a static mould as described, for example, in U.S. Pat. No. 4 347 198.

The photo-crosslinking can be brought about in the mould, for example by actinic radiation, e.g. UV light, or ionising radiation, e.g. gamma rays or X-rays.

As already mentioned, the photo-crosslinking is advantageously carried out in the presence of a photoinitiator capable of initiating free-radical crosslinking. The photoinitiator is advantageously added to the prepolymers of the invention before introduction into the mould, preferably by mixing the polymers and the photoinitiator with one another. The amount of photoinitiator may be selected within wide limits, an amount of up to 0.05 g/g of polymer and especially of up to 0.003 g/g of polymer having proved beneficial.

It is to be stressed that, according to the invention, the crosslinking may take place in a very short time, for example in $\leq 60$ minutes, advantageously in $\leq 20$ minutes, especially in $\leq 10$ minutes, more especially in $\leq 5$ minutes, even more especially in $\leq 1$ minute and most especially in $\leq 30$ seconds.

Opening of the mould so that the moulding can be removed from the mould can be carried out in a manner known per se.

If the moulding manufactured according to the invention is a contact lens and the latter has been manufactured under solventless conditions from a previously purified prepolymer of the invention, then it is normally unnecessary for the removal of the moulding to be followed by purification steps, e.g. extraction, because the prepolymers used do not contain any undesired low-molecular-weight constituents; consequently, the crosslinked product also is free or substantially free of such constituents and subsequent extraction can be dispensed with. The contact lens can accordingly be converted into a ready-for-use contact lens directly in conventional manner by hydration. Suitable forms of hydration capable of producing ready-for-use contact lenses with a wide variety of water contents are known to the person skilled in the art. The contact lens is swelled, for example, in water, in an aqueous salt solution, especially in an aqueous salt solution having an osmolarity of approximately from 200 to 450 milliosmol in 1000 ml (unit: mosm/l), preferably approximately from 250 to 350 mosm/l and especially approximately 300 mosm/l, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts customary in the field of contact lens care, e.g. phosphate salts, or isotonising agents customary in the field of contact lens care, such as, especially, alkali metal halides, e.g. sodium chloride, or solutions of mixtures thereof. An example of an especially suitable salt solution is a synthetic, preferably buffered, lachrymal fluid that has been matched to natural lachrymal fluid with regard to pH value and osmolarity, e.g. an unbuffered or preferably buffered, for example phosphate buffer-buffered, sodium chloride solution the osmolarity and pH value of which correspond to the osmolarity and pH value of human lachryrnal fluid.

The hydration fluids defined above are preferably pure, that is to say free or substantially free of undesired constituents. Most preferably, the hydration fluid is pure water or a synthetic lachrymal fluid as described above.

If the moulding manufactured according to the invention is a contact lens and the latter has been manufactured from an aqueous solution of a previously purified prepolymer of the invention, the crosslinked product also will not contain any troublesome impurities. There is normally no need, therefore, for subsequent extraction. Since the crosslinking is carried out in a substantially aqueous solution, there is also no need for subsequent hydration. In accordance with an advantageous embodiment, therefore, the contact lenses obtainable by this process are distinguished by the fact that they are suitable for use as intended without extraction. The expression "use as intended" is understood in this context to mean especially that the contact lenses can be inserted into the human eye.

The contact lenses obtainable according to the invention have a range of unusual and extremely advantageous properties. Among those properties, there may be mentioned, for example, their excellent compatibility with the human cornea, which is due to a balanced ratio of water content, oxygen permeability and mechanical properties. The contact lenses of the invention furthermore have a high dimensional stability. Even after autoclaving at, for example, approximately 120° C. no changes in shape can be detected.

Attention may also be drawn to the fact that the contact lenses of the invention, that is to say especially those comprising a crosslinked polymer of a prepolymer of formula (1), can be manufactured in a very simple and efficient manner compared with the prior art. This is due to several factors. Firstly, the starting materials can be obtained or prepared at little cost. Secondly, there is the advantage that the prepolymers are surprisingly stable and can therefore be subjected to high-grade purification. For crosslinking, therefore, it is possible to use a polymer that requires virtually no subsequent purification, such as, especially, laborious extraction of unpolymerised constituents. Furthermore, the crosslinking can be carried out under solventless conditions or in aqueous solution, with the result that subsequent solvent exchange and the hydration step are not necessary. Finally, the photopolymerisation takes place within a short time, so that the manufacturing process of the contact lenses of the invention can be made extraordinarily economic from that point of view also.

All of the advantages mentioned above apply, of course, not only to contact lenses but also to other mouldings of the invention. The sum of the various advantageous aspects in the manufacture of the mouldings of the invention results in the mouldings of the invention being especially suitable as mass-produced articles, such as, for example, contact lenses that are worn for a short period and then replaced by new lenses.

In the Examples which follow, amounts are by weight, unless specified otherwise, and temperatures are given in degrees Celsius.

EXAMPLE 1

Preparation of a Polyurea 300 g of tetrahydrofuran (THF), 160 g of water, 95.7 g of bis(2-aminopropyl)polyethylene glycol 800, 65.68 g of bis (2-aminopropyl)polyethylene glycol 500 and 4.13 g of diethylenetriamine are placed in a glass apparatus. At an internal temperature of approximately from 3 to 6° C., a solution of 48.91 g of isophorone diisocyanate in 35 g of THF is added dropwise with intensive stirring and the reaction mixture is left to react at from 2 to 6° C. for approximately a further 25 minutes. The internal temperature is then increased over a period of approximately 3 hours to from 25 to 30° C. and, when the reaction is complete, the THF is distilled off under reduced pressure using a rotary evaporator. The aqueous solution is then purified at room temperature by means of filtration over a 0.45 μm filter and via ultrafiltration using a 1 kD filter. The purified solution is concentrated and the residue is dried for approximately 1 hour at 70° C./0.1 mbar. A yellowish, highly viscous polyurea is obtained, having 0.31 mol. equiv. of amine/g.

EXAMPLE 2

Preparation of a Crosslinkable Polyurea

Analogously to Example 1, 95.7 g of bis(2-aminopropyl) polyethylene glycol 800, 65.68 g of bis(2-aminopropyl) polyethylene glycol 500 and 4.13 g of diethylenetriamine are placed in 300 ml of THF and 160 ml of water, and a solution of 48.91 g of isophorone diisocyanate in 160 ml of THF is added dropwise. The reaction mixture is left to react at from 3 to 8° C. for approximately a further 105 minutes and then 50 ml of 2N sodium hydroxide solution and 50 mg of 4-hydroxy-2,2,6,6-tetramethylpiperidin-1-yl are added thereto and 7.24 g of acryloyl chloride are added dropwise over a period of approximately 8 minutes. After a further 100 minutes, 3 g of solid sodium hydroxide are added to the reaction mixture and then a further 7.24 g of acryloyl chloride are added dropwise. This is followed by stirring for approximately 2.5 hours at approximately from 2 to 18° C. and by removal of the THF from the reaction mixture by distillation. The aqueous solution is then purified at room temperature by means of filtration over a 0.45 μm filter and via ultrafiltration using a 1 kD filter. The resulting clear, colourless solution is concentrated at 60° C./30 to 100 mbar until the solids content is 45.7% by weight. For analytical purposes, a sample is lyophilised and analysed. The double bond content of the dried polymer is 0.36 equivalent of double bond/g.

EXAMPLE 3

Manufacture of a Contact Lens 9.2 mg of a photoinitiator (Irgacure® 2959) are dissolved in 13.06 g of a 35% polyurea solution prepared according to Example 2, and the resulting solution is purified by filtration over a 0.45 μm filter. Then, the polyurea solution provided with the photoinitiator is introduced into a contact lens mould and irradiated for 7.6 seconds, corresponding to a dose of 18 mJ/cm$^2$. Colourless transparent lenses having the following physical data are obtained: water content 68%, elongation at tear >210%, modulus 1.228 MPa.

EXAMPLES 4–11

Transparent contact lenses having good all-round properties are also obtained by following the procedure described in Examples 2 and 3 and reacting together, instead of the components used therein, the compounds listed in the following Table, in the amounts indicated.

TABLE

| Ex. No | Compound of formula (10) | Compound of formula (12) | Compound of formula (11) | Compound of formula (13) |
|---|---|---|---|---|
| 4 | 1 mol. equiv. PEG 500/PEG 800 (1:1) | 0.27 mol. equiv. DETA | 1.2 mol. equiv. HMDI | 0.41 mol. equiv. IEM |
| 5 | 1 mol. equiv. PEG 1900 | 0.37 mol. equiv. DETA | 1.1 mol. equiv. MBCYI | 0.91 mol. equiv. IEM |
| 6 | 1 mol. equiv. PEG 500/PEG 800 (1:1) | 0.2 mol. equiv. DETA | 1.1 mol. equiv. TMDI | 0.4 mol. equiv. A-Cl |
| 7 | 1 mol. equiv. PEG 500/PEG 800 (7:3) | 0.15 mol. equiv. TETA | 1.1 mol. equiv. IPDI | 0.4 mol. equiv. A-Cl |
| 8 | 1 mol. equiv. PEG 800 | 0.2 mol. equiv. DETA | 1.1 mol. equiv. IPDI | 0.4 mol. equiv. CA-Cl |
| 9 | 1 mol. equiv. PEG 800/ BHEED (1:1) | 0.2 mol. equiv. DETA | 1.1 mol. equiv. IPDI | 0.4 mol. equiv. A-Cl |
| 10 | 1 mol. equiv. PEG 800 | 0.2 mol. equiv. DETA | 1.1 mol. equiv. IPDI | 0.4 mol. equiv. MA |
| 11 | 1 mol. equiv. PEG 800 | 0.2 mol. equiv. DETA | 1.1 mol. equiv. IPDI | 0.4 mol. equiv. MIB-Cl |

In the Table, PEG 500, PEG 800 and PEG 1900 denote bis(2-aminopropyl)polyethylene glycol 500, 800 and 1900; BHEED denotes N,N'-bis(2-hydroxyethyl)ethylenediamine; DETA denotes diethylenetriamine; TETA denotes triethylenetetramine; HMDI denotes hexamethylene-1,6-diisocyanate; MBCYI denotes 4,4'-methylene-bis (cyclohexyl isocyanate); TMDI denotes 1,6-diisocyanato-2,2,4-trimethyl-n-hexane; IPDI denotes isophorone diisocyanate; IEM denotes 2-isocyanatoethyl methacrylate; A-Cl denotes acrytoyl chloride; CA-Cl denotes cinnamic acid chloride; MA denotes maleic acid anhydride; and MIB-Cl denotes 4-maleimidyl-benzoyl chloride.

What is claimed is:

1. A prepolymer of formula

                                    (1), wherein

Q is an organic radical that comprises at least one crosslinkable group, and

CP is a bivalent copolymer fragment consisting of the segments A, B and T, wherein:

A is a bivalent radical of formula

                                    (2a), wherein $A_1$ is the bivalent radical of a polyalkylene glycol or is a linear or branched alkylene radical having from 2 to 24 carbon atoms and each of R and R' independently of the other is hydrogen or unsubstituted or substituted $C_1$–$C_6$alkyl or, in the case of the amino group that terminates the copolymer fragment, may also be a direct, ring-forming bond;

T is a bivalent radical of formula

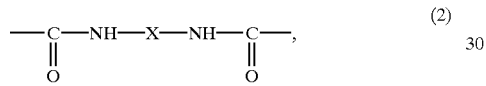                                    (2)

wherein X is a bivalent aliphatic, cycloaliphatic, aliphatic-cycloaliphatic, aromatic, araliphatic or aliphatic-heterocyclic radical; and B is a radical of formula A

                                    (2b), wherein each of $R_1$ and $R_1'$ independently of the other has the meanings given above for R, $B_1$ is a bivalent atiphatic, cycloaliphatic, aliphatic-cycloaliphatic, aromatic or araliphatic hydrocarbon radical that is interrupted by at least one amine group of formula

                                    (3)

$R_2$ is hydrogen, a radical Q mentioned above or a radical of formula

                                    (4), wherein

Q is as defined above, and CP' is a bivalent copolymer fragment independently consisting of at least two of the above-mentioned segments A, B and T; with the provisos that in the copolymer fragments CP and CP' a segment A or B is followed by a segment T in each case;

that in the copolymer fragments CP and CP' a segment T is followed by a segment A or B in each case;

that the radical Q in formulae (1) and (4) is bonded to a segment A or B in each case; and that the N atom in formula (3) is bonded to a segment T when $R_2$ is a radical of formula (4).

2. A prepolymer according to claim 1, wherein Q is (i) an olefinically unsaturated to copolymerisable radical $R_3$ having from 2 to 24 carbon atoms which may be further substituted, or (ii) a group of formula

                                    (5)

wherein $Q_1$ is a radical of formula

                                    (5a)

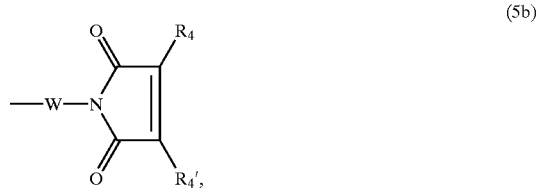                                    (5b)

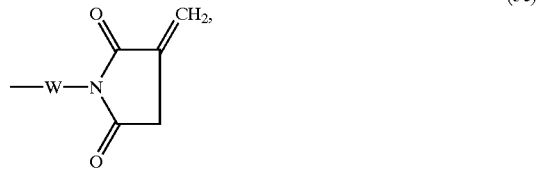                                    (5c)

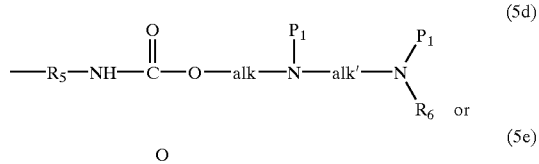                                    (5d)

or $$—Z''—NH—\overset{O}{\underset{\|}{C}}—R_3,$$                                (5e)

and wherein

Z is linear or branched $C_1$–$C_{12}$alkylene, $R_3$ is an olefinically unsaturated copolymerisable radical having from 2 to 24 carbon atoms which may be further substituted, W is a $C_2$–$C_{12}$alkylene radical, phenylene radical or $C_7$–$C_{12}$aralkylene radical, each of $R_4$ and $R_4'$ independently of the other is hydrogen, $C_1$–$C_4$alkyl or halogen, $R_5$ is a bivalent aliphatic, cycloaliphatic, aliphatic-cycloaliphatic, aromatic, araliphatic or aliphatic-heterocyclic hydrocarbon radical, $R_6$ is hydrogen or $C_1$–$C_4$alkyl, each of alk and alk' independently of the other is a linear or branched $C_1$–$C_{12}$alkylene radical, each of m and n independently of the other is the number 0 or 1, Z'' is $C_1$–$C_6$alkylene and $P_1$ independently is a radical of the above-mentioned formula (5) wherein $Q_1$ is a radical of the above formula (5a), (5b), (5c) or (5e) and n independently is as defined above, or (iii) Q together with —NR—, —NR', —NR, or —$NR_1'$ forms a cyclic ring of formula (5b')

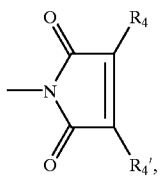

wherein each of $R_4$ and $R_4'$ independently of the other is as defined above.

3. A prepolymer according to claim 2, wherein Q is a radical of formula (5) wherein n is the number 0 and $Q_1$ is a radical of formula (5a) wherein m is 0, $R_3$ is a radical of formula (6)

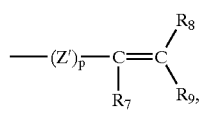

wherein p is the number 0 or 1, (5')

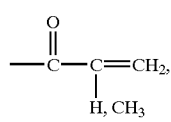

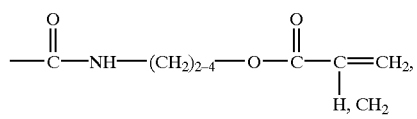

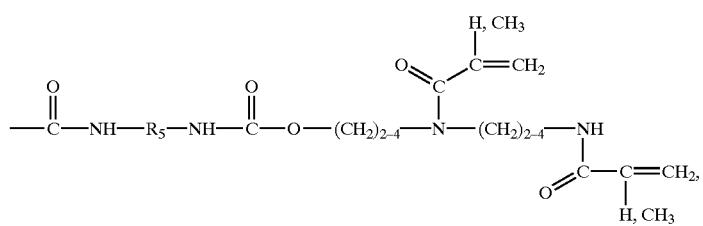

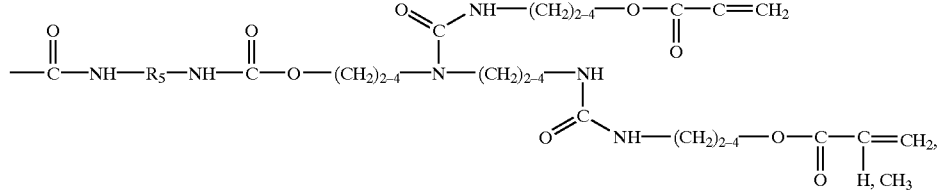

(5*)

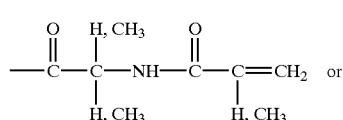   or $R_7$ is hydrogen, $C_1$–$C_4$alkyl or halogen, each of $R_8$ and $R_9$ independently of the other is hydrogen, $C_1$–$C_4$alkyl, phenyl, carboxy or halogen, and Z' is linear or branched $C_1$–$C_{12}$alkylene or unsubstituted or $C_1$–$C_4$alkyl- or $C_1$–$C_4$alkoxy-substituted phenylene or $C_7$–$C_{12}$aralkylene.

4. A prepotymer according to claim 2, wherein Q is a radical of formula (5) wherein n is the number 1 and $Q_1$ is a radical of formula (5a) wherein m is 1, $R_3$ is a radical of formula (6)

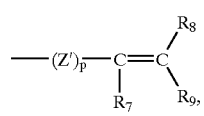

wherein p is the number 0, $R_7$ is hydrogen or $C_1$–$C_4$alkyl, $R_8$ is hydrogen, methyl, chlorine or phenyl, $R_9$ is hydrogen or carboxy, and Z is linear or branched $C_1$–$C_{12}$alkylene.

5. A prepolymer according to claim 1, wherein Q is a radical of formula (5")

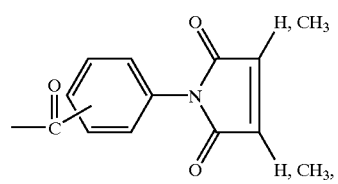 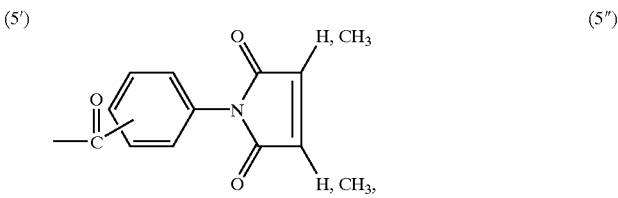

(5''')

(5'''')

(5''''')

(5b'')

wherein $R_5$ is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl.

6. A prepolymer according to claim 5, wherein Q is a radical of formula 5' or 5'''.

7. A prepolymer according to claim 1, wherein A is a bivalent radical of formula (2a) wherein R and R' are each hydrogen or $C_1$–$C_4$alkyl and $A_1$ is a bivalent polyalkylene glycol radical of formula

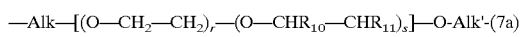

wherein (Alk) and (Alk') are identical and each is linear or branched $C_2$–$C_6$alkylene, one of the radicals $R_{10}$ and $R_{11}$ is hydrogen and the other is methyl, and each of r and s independently of the other is a number from 0 to 80, the sum of (r+s) being from 2 to 80.

8. A prepolymer according to claim 1, wherein A is a bivalent radical of formula (2a) wherein R and R' are each hydrogen and $A_1$ is a bivalent polyalkylene glycol radical of formula

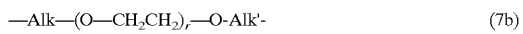

wherein (Alk) and (Alk') are identical and each is linear or branched $C_2$–$C_4$alkylene, and r is a number from 4 to 50.

9. A prepolymer according to claim 1, wherein A is a bivalent radical of formula (2a) wherein R and R' are each hydroxy-substituted $C_1$–$C_4$alkyl and $A_1$ is a $C_2$–$C_6$-alkylene radical.

10. A prepolymer according to claims 1, wherein T is a bivalent radical of formula (2) given in claim 1, wherein X is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl.

11. A prepolymer according claim 1, wherein B is a radical of formula (2b) wherein each of $R_1$ and $R_1'$ independently of the other is hydrogen or $C_1$–$C_4$alkyl and $B_1$ is a radical of formula

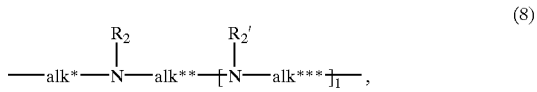

wherein each of alk*, alk and alk* independently of the others is a $C_2$–$C_{12}$alkylene radical; I is the number 1 or 0 and each of $R_2$ and $R_2'$ independently of the other has the meanings given in claim 1 for $R_2$.

12. A prepolymer of formula (1) according to claim 1, wherein Q is a radical of formula

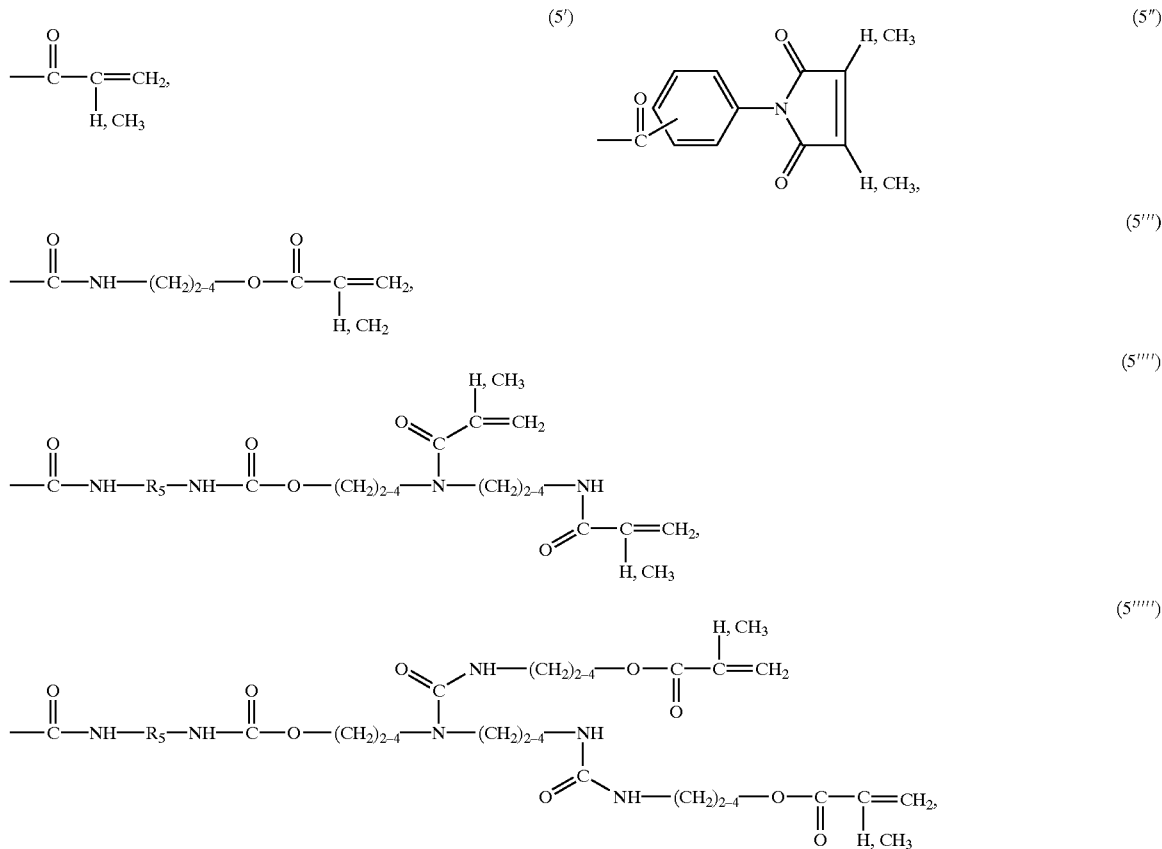

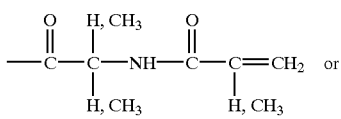 (5*)

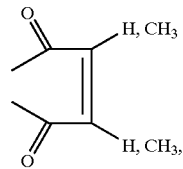 (5b''')

wherein

R₅ is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl, and CP is a bivalent copolymer fragment consisting of the segments A, B and T, wherein A is a bivalent radical of formula (2a) wherein each of R and R' independently of the other is hydrogen or $C_1$–$C_4$alkyl and $A_1$ is a radical of formula

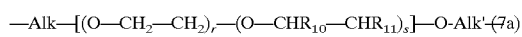 (7a)

wherein (Alk) and (Alk') are identical and each is linear or branched $C_2$–$C_6$alkylene, one of the radicals $R_{10}$ and $R_{11}$ is hydrogen and the other is methyl, and each of r and s independently of the other is a number from 0 to 80, the sum of (r+s) being from 2 to 80;

T is a bivalent radical of formula (2) given in claim 1, wherein X is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl; and B is a radical of formula (2b) wherein each of $R_1$ and $R_1'$ independently of the other is hydrogen, $C_1$–$C_2$alkyl or hydroxy-$C_1$–$C_2$alkyl and $B_1$ is a bivalent radical of formula

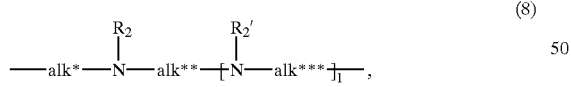 (8)

wherein each of alk*, alk and alk* independently of the others is a $C_2$–$C_{12}$alkylene radical; I is the number 1 or 0, and each of $R_2$ and $R_2'$ independently of the other is hydrogen; a radical Q wherein Q is as defined above, or a radical of formula

Q—CP'— (4)

wherein Q is as defined above and CP' is a bivalent copolymer fragment independently consisting of at least two of the above-mentioned segments A, B and T.

13. A prepolymer of formula (1) according to claim 1, wherein

Q is a radical of formula

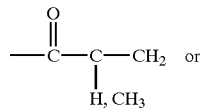 (5')

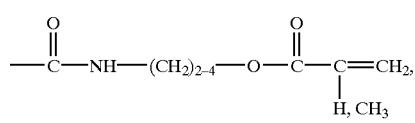 (5''')

and CP is a bivalent copolymer fragment consisting of the segments A, B and T, wherein A is a bivalent radical of formula (2a) wherein R and R' are each hydrogen and $A_1$ is a radical of formula

 (7b)

wherein (Alk) and (Alk') are identical and each is linear or branched C2-C4alkylene, and r is a number from 4 to 50;

T is a bivalent radical of formula (2) given in claim 1, wherein X is the radical of adiisocyanate, less the two isocyanato groups, selected from the group isophorone diisocyanate (IPDI), toluylene-2,4-diisocyanate (TDI), methylenebis(cyclohexyl isocyanate), 1,6-diisocyanato-2,2,4-trimethyl-n-hexane (TMDI), methylenebis(phenyl isocyanate), methylenebis(cyclohexyl isocyanate) and hexamethylene diisocyanate (HMDI); and B is a radical of formula (2b) wherein $R_1$ and $R_1'$ are each hydrogen and $B_1$ is a bivalent radical of formula

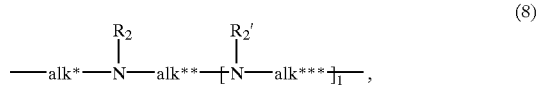 (8)

wherein I is the number 0; each of alk* and alk** independently of the other is a $C_2$–$C_6$alkylene radical; and each of $R_2$ and $R_2'$ independently of the other is hydrogen; a radical Q wherein Q is as defined above, or a radical of formula

Q—CP'— (4)

wherein Q is as defined above and CP' is a bivalent copolymer fragment independently consisting of at least two of the above-mentioned segments A, B and T.

14. A process for the preparation of a prepolymer of formula (1) according to claim 1, which comprises reacting together a compound of formula

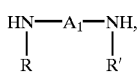  (10)

a compound of formula $$O=C=N-X-N=C=O \quad (11),$$

and a compound of formula

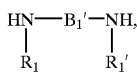  (12)

wherein $A_1$, R, R', $R_1$, $R_1'$ and X are each as defined in claim 1 and $B_1'$ independently has the meanings given in claim 1 for $B_1$, except that $R_2$ in the amine groups of formula (3) is in each case hydrogen, and reacting the copolymer so obtained of formula $$H-CP^*-H \quad (1a),$$

wherein CP* independently has the meanings given in claim 1 for CP, except that $R_2$ in the segments B is hydrogen or a radical —CP'—NR"H, R" independently has the meanings given in claim 1 for R and CP' is as defined in claim 1, with a compound of formula $$Y-Q_1 \quad (13),$$

wherein $Q_1$ is a radical of formula

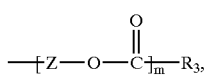  (5a)

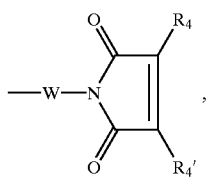  (5b)

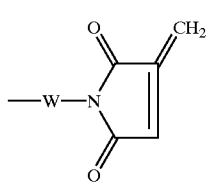  (5c)

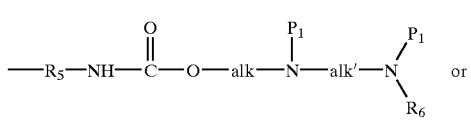  (5d)

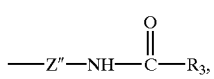  (5e)

and wherein Z is linear or branched $C_1$–$C_{12}$alkylene, $R_3$ is an olefinically unsaturated copolymerisable radical having from 2 to 24 carbon atoms which may be further substituted,
W is a $C_2$–$C_{12}$alkylene radical, phenylene radical or $C_7$–$C_{12}$aralkylene radical, each of $R_4$ and $R_4'$ independently of the other is hydrogen, $C_1$–$C_4$alkyl or halogen, $R_5$ is a bivalent aliphatic, cycloaliphatic, aliphatic-cycloaliphatic, aromatic, araliphatic or aliphatic-heterocyclic hydrocarbon radical, $R_6$ is hydrogen or $C_1$–$C_4$alkyl, each of alk and alk' independently of the other is a linear or branched $C_1$–$C_{12}$alkylene radical, m is the number 0 or 1,
Z" is $C_1$–$C_6$alkylene and P1 independently is a radical of the formula

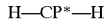  (5)

$Q_1$ is a radical of the above formula (5a), (5b), (5c) or (5e) and n is the number 0 or 1, and Y is halogen, a carboxyl group —COOH; a carboxyl group derivative or a group —N=C=O, or wherein $Q_1$ together with Y forms a heterocyclic compound.

15. A prepolymer obtained by the process according to claim 14.

16. A copolymer of formula $$H-CP^*-H \quad (1a),$$

wherein CP* independently has the meanings given in claim 1 for CP, except that $R_2$ in the segments B is hydrogen or a radical —CP'—NR"H, R" independently has the meanings given in claim 1 for R and CP' is as defined in claim 1.

17. A compound of formula

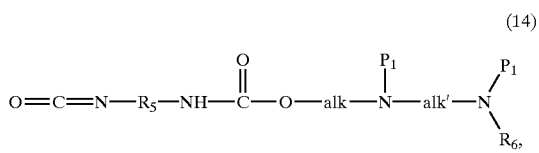  (14)

wherein $R_5$ is a bivalent aliphatic, cycloaliphatic, aliphatic-cycloaliphatic, aromatic, araliphatic or aliphatic-heterocyclic hydrocarbon radical, $R_6$ is hydrogen or $C_1$–$C_4$alkyl, each of alk and alk' independently of the other is a linear or branched $C_1$–$C_{12}$alkylene radical, and $P_1$ is a radical of formula (5) given in claim 2, wherein $Q_1$ is a radical of formula (5a), (5b) or (5c) given in claim 2 and n is as defined in claim 2.

18. A compound of formula

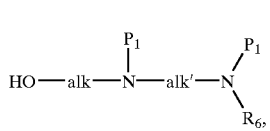  (16)

wherein $R_6$ is hydrogen or $C_1$–$C_4$alkyl, each of alk and alk' independently of the other is a linear or branched $C_1$–$C_{12}$alkylene radical, and $P_1$ is a radical of formula (5) given in claim 2, wherein $Q_1$ is a radical of formula (5a), (5b) or (5c) given in claim 2 and n is as defined in claim 2.

19. A polymer obtained by crosslinking a prepolymer according to claim 1, in the absence or presence of an additional vinyl comonomer.

20. A polymer according to claim 19, obtained by photocrosslinking a prepolymer according to claim 1 in the absence of an additional vinyl comonomer.

21. A process for the preparation of a polymer according to claim 19, which comprises photo-crosslinking a prepolymer according claim 1 in the absence or presence of an additional vinyl comonomer.

22. A process according to claim 21, wherein the prepolymer is used in substantially pure form.

23. A process for the manufacture of mouldings, which comprises the following steps:
 a) introducing into a mould a prepolymer of formula (1) of claim 1 that is liquid at room temperature or readily meltable and that is substantially free of solvents, in the absence or presence of an additional vinyl comonomer and/or photoinitiator,
 b) causing photo-crosslinking for a period of ≦60 minutes,
 c) opening the mould so that the moulding can be removed from the mould.

24. A process for the manufacture of mouldings, which comprises the following steps:
 a) preparing a substantially aqueous solution of a water-soluble prepolymer of formula (1) of claim 1 in the absence or presence of an additional vinyl comonomer and/or photoinitiator,
 b) introducing the resulting solution into a mould,
 c) causing photo-crosslinking for a period of ≦60 minutes,
 d) opening the mould so that the moulding can be removed from the mould.

25. A process according to claim 23, wherein the moulding is a contact lens.

26. A process according to claim 24, wherein the moulding is a contact lens.

27. A moulding obtained by the process according to claim 23.

28. A moulding obtained by the process according to claim 24.

* * * * *